(12) United States Patent
Liege

(10) Patent No.: US 8,473,720 B2
(45) Date of Patent: Jun. 25, 2013

(54) METHOD FOR PROVIDING DATA TO A DIGITAL PROCESSING MEANS

(75) Inventor: Bruno Liege, Boulogne (FR)

(73) Assignee: DXO Labs, Boulogne Billancourt (FR)

( * ) Notice: Subject to any disclaimer, the term of this patent is extended or adjusted under 35 U.S.C. 154(b) by 1302 days.

(21) Appl. No.: 12/097,886

(22) PCT Filed: Dec. 19, 2006

(86) PCT No.: PCT/FR2006/051388
§ 371 (c)(1),
(2), (4) Date: Sep. 12, 2008

(87) PCT Pub. No.: WO2007/071882
PCT Pub. Date: Jun. 28, 2007

(65) Prior Publication Data
US 2009/0037877 A1  Feb. 5, 2009

(30) Foreign Application Priority Data
Dec. 19, 2005  (FR) .................................. 05 53947

(51) Int. Cl.
*G06F 13/00* (2006.01)
(52) U.S. Cl.
USPC ........................................................ 712/220
(58) Field of Classification Search
None
See application file for complete search history.

(56) References Cited

U.S. PATENT DOCUMENTS

| | | | | |
|---|---|---|---|---|
| 5,923,892 A | * | 7/1999 | Levy | 712/31 |
| 5,937,193 A | * | 8/1999 | Evoy | 717/140 |
| 5,999,179 A | * | 12/1999 | Kekic et al. | 715/734 |
| 6,305,009 B1 | * | 10/2001 | Goor | 717/116 |
| 6,321,323 B1 | * | 11/2001 | Nugroho et al. | 712/34 |
| 6,847,980 B1 | * | 1/2005 | Benitez et al. | 707/741 |
| 7,343,040 B2 | | 3/2008 | Chanas et al. | |
| 7,346,221 B2 | | 3/2008 | Chanas et al. | |
| 7,356,198 B2 | | 4/2008 | Chauville et al. | |
| 7,747,989 B1 | * | 6/2010 | Kissell | 717/148 |
| 7,901,291 B2 | * | 3/2011 | Hecht et al. | 463/42 |
| 7,987,455 B1 | * | 7/2011 | Senner et al. | 717/136 |
| 8,166,507 B2 | * | 4/2012 | McDowell et al. | 725/82 |
| 2002/0057286 A1 | * | 5/2002 | Markel et al. | 345/704 |
| 2002/0170039 A1 | * | 11/2002 | Kovacevic | 717/138 |
| 2004/0218071 A1 | | 11/2004 | Chauville et al. | |
| 2004/0234152 A1 | | 11/2004 | Liege et al. | |
| 2004/0240750 A1 | | 12/2004 | Chauville et al. | |
| 2004/0252906 A1 | | 12/2004 | Liege et al. | |
| 2005/0002586 A1 | | 1/2005 | Liege et al. | |
| 2005/0008242 A1 | | 1/2005 | Liege et al. | |

OTHER PUBLICATIONS

U.S. Appl. No. 12/158,129, filed Aug. 22, 2008, Liege.
U.S. Appl. No. 12/097,893, filed Jun. 18, 2008, Liege.
U.S. Appl. No. 12/838,184, filed Jul. 16, 2010, Liege, et al.

* cited by examiner

*Primary Examiner* — Eric Coleman
(74) *Attorney, Agent, or Firm* — Oblon, Spivak, McClelland, Maier & Neustadt, L.L.P.

(57) ABSTRACT

A method for providing generic formatted data to at least one digital data processor, configured to translate generic formatted data into specific formatted data. The generic formatted data includes data relative to logical blocks, at least one of the logical blocks corresponding to an object to be processed directly or indirectly according to specific formatted data by at least one processing platform with processor(s) and memory(ies), located upstream from the processor or integrated into the processor, the object being made up of elementary information of same type, all information being represented by at least one numerical value.

12 Claims, 2 Drawing Sheets

METHOD FOR PROVIDING DATA TO A DIGITAL PROCESSING MEANS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Technical Field

Figure 1:
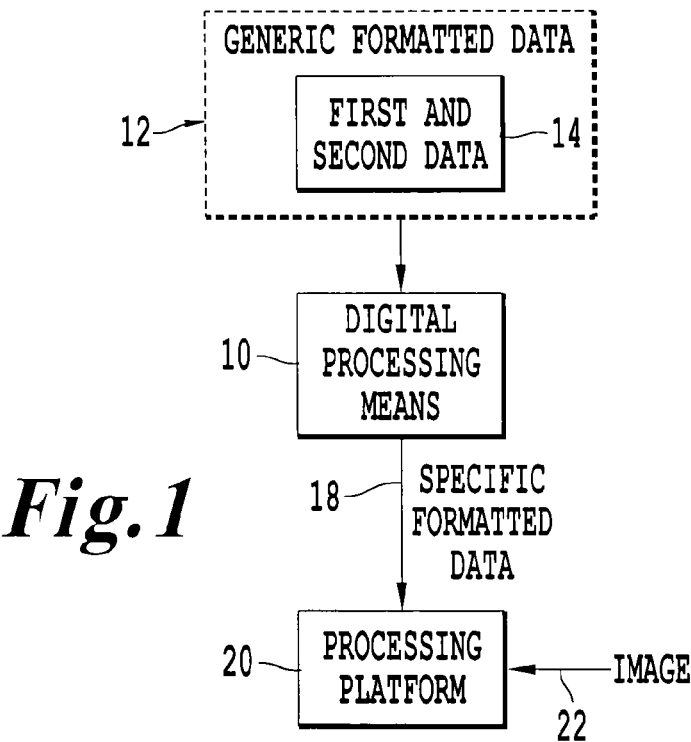

The present invention relates to a method for providing generic formatted data to a digital data processing means.

2. Background Art

When new algorithms are to be developed for one or more object processing platforms with major restrictions in terms of memory consumed and computational power consumed, the development process takes a very long time. Indeed, each platform has its own characteristics, both in terms of equipment (for example, the number and type of processors or size and type of memory) and in terms of language used (C for a scalar processor and assembly language for a vector signal processor). Thus, even if an algorithm has already been developed for a platform, its optimised adaptation for another platform requires that the program or code be rewritten virtually in full.

For example, a signal processor has a small local memory and must copy data from and to the main memory from this local memory. For another example, a vector signal processor, notably of SIMD (Single Instruction Multiple Data) type must process data grouped into vectors of different sizes according to platform and the vectors cannot be expressed independently from the platform when a language such as language C is used.

These adaptations constitute an obstacle in the distribution of new algorithms since, for example, the adaptation of an image processing software program to a type of photographic equipment can take several months to develop.

The market for cameras, notably telephones fitted with a camera, of the "cameraphone" type, is very dynamic, with renewal of the range every six to twelve months and a very fast evolution in terms of functions. Therefore, being able to adapt fast to these new functions has become essential in order to keep up with the market.

Furthermore, computational power is increasing very fast and it is possible therefore to take advantage of this performance with increasingly powerful algorithms, provided that these can be optimised quickly. Furthermore, the characteristics of the sensors are evolving very fast and it is therefore necessary to adapt the image processing algorithms to the characteristics of these sensors, notably noise-related characteristics which increase with miniaturization, provided that these can be optimised quickly.

BRIEF SUMMARY OF THE INVENTION

The invention is based on the analysis that, to remedy these drawbacks, the algorithms need to be developed in a language that is independent from the organisation of data and from the processing order, without explicitly coding this information manually to remain independent from the platform and to leave any manoeuvre margin to automatic tools.

The existing languages do not allow this objective to be achieved, since they all impose conditions which characterise the algorithms for a given platform.

Thus, for example, imperative languages such as the language C impose the explicit coding of loops and therefore the definition of a processing order. Table languages such as Matlab, do allow mixing table processing operations with direct processing operations on the elementary information, these direct processing operations resulting in breaking the regularity of the code and preventing extensive automatic optimisations.

Furthermore, with the known languages, in order to carry out operations on images with relative displacement or relative scales, notably dependent on the absolute position in the object, it is necessary to use explicit manipulations of elementary information by using accesses to the pixels and to the loops, which introduces a high dependency of the code on the platform, notably in terms of memory and parallelism.

Thus, the programs written with such languages are dependent on the data processing platform, since they contain instructions which directly involve the elementary information.

The aim of the invention is to provide generic formatted data in order to remedy at least one of the above-cited drawbacks and thus to accelerate the market release of equipment and software for processing data, notably images, by obtaining optimised implementation automatically and quickly for diverse platforms of any algorithm.

Furthermore, the invention permits modifying algorithms belatedly, for example to:
 benefit from the performance of processors as soon as they are released on the market, and/or
 benefit from the latest progress in matters of the processing of data, notably images, and/or
 account for the platform's specific characteristics, for example, in the case of an image capturing device, to adapt an algorithm quickly to the characteristics of a sensor and/or an optic.

The invention thus relates to a method for providing generic formatted data to at least one digital data processing means, destined to translate the generic formatted data into specific formatted data. Generic formatted data include data relative to logical blocks, at least one of the logical blocks corresponding to an object to be processed according to, directly or indirectly, specific data formatted by at least one processing platform with processor(s) and memory(ies), located upstream from the processing means or integrated into the processing means. The object to be processed is made up of elementary information of same type, all information being represented by at least one numerical value.

The method comprises the following steps:
 The digital processing means is provided with first data, being part of generic formatted data, and describing at least one sequence of generic operations to be performed on at least one logical block and/or on at least one parameter.

The digital processing means is provided with second data, for generic operations involving several logical blocks. This second data is part of the generic formatted data and refers to the relative position, according to at least one of the object's dimensions, notably spatial and/or temporal, of the blocks and/or parameters in relation to each other, and/or referring to the relative scale, according to at least one of the object's dimensions, notably spatial and/or temporal, of the logical blocks and/or of the parameters in relation to each other.

Generic formatted data is digital data describing a processing operation to be performed on an object at one or several dimensions, comprised in the group including: an image, a digital audio signal, a sequence of images, a modulated signal, simulation data and a numerical mesh.

An object to be processed is a physical entity made up of physical data in the form of elementary information comprised in the group including: pixels of an image, samples of a digital audio signal, intensity and phase of a modulated signal, data characterising the status of simulation data, the temporal and/or spatial information characterising the points of a numerical mesh.

The generic formatted data provided to the processing means excludes the data relative to the identification of elementary information and to the order wherein the elementary information will be processed by the platform, such that the generic formatted data is independent from the processing platform used. This generic formatted data is also independent from data relative to the decomposition of the object into sub-objects, to the form, size and overlay of these sub-objects, and to the storage of the elementary information forming these sub-objects in a memory.

This data relative to the order and to the decomposition into sub-objects and is determined by the processing means.

In the present description, generic formatted data is digital data used for describing a processing operation to be performed on an object by a data processing platform, independently of the platform itself. This generic formatted data is, in the present invention, supplied to a processing means which can contain the processing platform, or can be located upstream of the processing platform. The processed objects correspond to a set of elementary information of same type; these objects are, for example, images, digital audio, video or even simulation data.

Preferably, the sequence of generic operations does not include loops.

In one embodiment, the second data is part of the generic formatted data and refers to the relative position, according to at least one of the object's dimensions, notably spatial and/or temporal, of the blocks and/or parameters in relation to each other, and/or referring to the relative scale, according to at least one of the object's dimensions, notably spatial and/or temporal, of the logical blocks and/or of the parameters in relation to each other.

In one embodiment, the objects and sub-objects, as well as the logical blocks, have several dimensions.

The dimensions of the sub-objects and the logical blocks correspond to all or a part of the object's dimensions. The dimensions can be of different types, notably:
- spatial, for example a distance, an angle or a scrolling in a mesh,
- temporal,
- frequency, for example a colour, a frequency, a frequency band
- a phase,
- a decomposition according to another vector space base, for example a decomposition into wavelets
- generally, the dimensions of any space of any topology.

The following non-exhaustive list provides examples of objects with their dimensions:
- a still image with 2 dimensions, each corresponding to distances, notably measured in pixels,
- an unprocessed still image with 2 dimensions, each corresponding to distances, each pixel being equipped with a colour, for example red, green or blue,
- a still colour image, with 2 dimensions, each corresponding to distances, and one dimension corresponding to a frequency representing the colour channel, for example red/green/blue,
- a moving image with 3 dimensions, 2 of which correspond to distances, notably measured in pixels, and one corresponding to time,
- an image in relief with 3 dimensions, corresponding to distances,
- an image in relief with 3 dimensions, 2 of which correspond to distances, and the third corresponding to a viewing angle,
- a medical image with distance dimensions and possibly channel dimensions,
- a hologram with viewing angle dimensions,
- more generally, an image with distance and/or angle and/or temporal, and/or frequency dimensions,
- a sound with a dimension corresponding to time,
- a sound with 2 dimensions corresponding to time and to a channel,
- a modulated signal with one or several dimensions corresponding to time and, possibly, a frequency and, possibly, a position in space or an angle,
- signal modulation and demodulation, measurement, analysis of data, database indexing or searching, viewing by computer, graphic processing, simulation shown by elementary information disposed according to one or more dimensions,
- more generally an object with one or several dimensions.

In the present invention, an object's elementary information can have an absolute position and/or scale, notably spatial and/or temporal and/or frequency, but equally according to at least one of the object's dimensions as well as in any space, notably a space made up of wavelets:
- an elementary information for an "audio" object can correspond to an intensity; in this case, the elementary information has an absolute position corresponding to a given moment in time and, in the case of a multi-channel sound, to a given channel.
- an elementary information for an "image" object can correspond to a pixel; in this case, the elementary information has an absolute position corresponding to a position in the image and, in the case of a video image, to a given moment in time.
- an elementary information for a "data simulation" object can correspond to a status; in this case the elementary information has an absolute position corresponding to a meshing node and to a given moment in time.
- an elementary information for a "modulated signal" object can correspond to an intensity and/or a phase; in this case, the elementary information has an absolute position corresponding to a given point in time and, possibly, to a given frequency and/or to a given position, if several antennae or transmitters are used.

An elementary information is an element of information to be processed, represented by one or several numerical values. This information can be coded according to diverse types of coding such as 8 bit signed coding, 10 bit coding, or 16 bit signed coding. In the case where the object is an image, for example, the elementary information will be the pixels of this image.

The objects can be unprocessed images (of "raw" type) before demosaicing operation, in which case an elementary information is a pixel represented by a numerical value corresponding, according to the absolute position of the pixel, for example to red, green or blue. The objects can also be visible images, in which case an elementary information is a pixel represented, for example by three numerical values, each representing a colour, for example red, green and blue.

The objects can also be sequences of images, notably unprocessed or visible, in which case an elementary information is a pixel of an image from the sequence of images. The objects therefore correspond to videos, for example.

In the case where the object is an image, the image can be received from an image capturing device and/or destined to an image rendering device:
  An image capturing device is, for example, a disposable camera, a digital camera, a reflex camera (digital or not digital), a scanner, a fax, an endoscope, a video-camera, a camcorder, a surveillance camera, a toy, a video camera or a camera integrated or linked to a telephone, to a personal assistant or to a computer, a thermal camera, an ultrasound machine, a MRI (magnetic resonance) imaging unit, an X-ray radiography unit.
  An image rendering device is, for example, a screen, a projector, a television, virtual reality goggles, or a printer.
  An image capturing and image rendering device is, for example, a scanner/fax/printer, a compact photograph printing lab, a videoconferencing device.

The processing platform can take different forms, depending on the application. For example, in the case where the object is an image, the case will be cited notably where the processing platform is integrated into one of the following devices:
  An image capturing device which produces processed images, for example a digital camera which integrates a processing platform.
  An image rendering device which displays or prints processed images, for example a video projector or a printer including a processing platform.
  A mixed device which corrects faults on these elements, for example a scanner/printer/fax including a processing platform.
  A professional image capturing device which produces processed images, for example an endoscope including a processing platform.

The processing platform can be fully or partially deported on a server.

Processing, which will be applied to the object in the platform, corresponds to an algorithm, described by one or more sequences of generic operations, which can intervene in diverse fields such as, for example, image processing, data compression and decompression, audio processing, signal modulation and demodulation, measurement, data analysis, database indexing or searching, viewing by computer, graphic processing, simulation or any field involving a high quantity of data.

Generic operations are operations which apply to logical blocks, i.e. to abstract entities, without notion of size, nor form, nor time. Generic operations can produce logical blocks. Preferably, at least one logical block corresponds to the object to be processed.

The notion of relative scale and relative position of two logical blocks and/or parameters permits notably, without the list being restrictive:
  combination of several logical blocks and/or variable parameters according to the absolute position, and/or
  change of scale, and/or
  creation of filters on neighbourhoods, and/or
  determination of the value of a parameter when the value depends on the absolute position of the object's elementary information, and/or
  change of representation.

In the present invention, the logical blocks are of several types according to the generic operation, for example, in the case where the object is an image,
  at least one logical block is of "unprocessed" type, and/or
  at least one logical block is of red type, and/or
  at least one logical block is of green type, and/or
  at least one logical block is of blue type, and/or
  at least one logical block can be represented by 8 bit data, and/or
  at least one logical block can be represented by 16 bit data.

In one embodiment, at least one logical block contains multi-scale data, for example data at scale 1, ½, ¼ and ⅛. This makes it possible to carry out generic operations at several scales, and subsequently to combine the results At the time of processing, the logical blocks can, in one embodiment, correspond, according to the type of the logical block, to physical blocks made up of elements of the same type as the elementary information or else made up of elements of a different type to the elementary information. The notion of absolute or relative position is independent from the type of logical block. According to the invention, the notion of elementary information applies to all elements, whatever the type of logical block.

An algorithm can correspond, for example, without this list being restrictive, in the case where the object is an image, to:
  a calculation, notably statistic-based, for automatic white balance, and/or
  a calculation, notably statistic-based, for automatic exposure, and/or
  a calculation, notably statistic-based, for automatic focussing, and/or
  a calculation, notably statistic-based, for automatic contrast improvement, and/or
  a conversion of unprocessed image into visible image ("image pipe"), and/or
  a correction of optic faults, and/or
  a correction of sensor faults, and/or
  a correction of imager faults, and/or
  a processing operation, notably improvement of sharpness, and/or
  a processing operation, notably improvement of colour rendition, and/or
  a processing operation, notably improvement of contrast rendition, and/or,
  a processing operation, notably improvement of detail rendition, and/or
  a noise reduction, and/or
  a measurement, and/or
  a compression, and/or
  a decompression, and/or
  an interpolation or an enlargement (zoom), and/or
  A scan, and/or
  A special effect.

The object to be processed is generally, during the processing, decomposed into sub-objects, i.e. into groups of elementary information with a determined size and form, both in space and in time or in the object's other dimensions.

Generally, an algorithm's generic operations involve, further to elementary information, parameters such as, for example, multiplying factors.

These parameters can correspond, for example, without the list being restrictive, to:
filter factors,
saturation values,
offset values, and
correlation tables.

In one embodiment, the value of a parameter, depending on this parameter's type, can:
be constant and intrinsic to the algorithm; in this case the value of the parameter can notably be transmitted to the processing means or to the platform, and/or
depend on the object's source or destination: for example, in the case where the object to be processed is an image from a device fitted with a given optic, the parameter's value can depend on the type of optic which has an impact on the level of sharpness in the image; in this case, the parameter's value can, notably, be transmitted to the processing means or to the platform, and/or
depend on the object to be processed: for example, in the case where the object to be processed is an image from a sensor, the parameter's value can depend on the gain of the sensor effectively used to capture said object which has an impact on the level of noise in the image; in this case, the parameter's value can notably be transmitted, selected or calculated by the platform, and/or
depend on the absolute position of the elementary information in the object; in this case, the parameter's value can notably be transmitted, selected or calculated by the platform, and/or
not depend on the absolute position of the elementary information in the object.

The parameter value can be determined simultaneously or a posteriori with relation to the definition of the algorithm.

Having seen that the value of certain parameters can vary from one object to another, from one sub-object to another, or from one elementary information to another. In this case, in one embodiment, the value of the parameter is calculated at each change. In another embodiment, the possible values for the parameter are calculated a priori, and, at each change, the index or the address is determined enabling access to the parameter's value, for example in a table. In another embodiment, more specifically adapted to the parameters whereby the value varies from one sub-object to another according to the absolute position of the sub-object and whereby the number of values is limited, for example the parameters corresponding to the optic sharpness characteristics, a limited number of parameter value sets are determined, each set is stored and for each sub-object the set to be used is selected, for example by calculating a function of the position giving the address of the set to be used.

In the case where the object is an image, in one embodiment the image is decomposed into juxtaposed rectangular sub-objects, the sub-objects being processed, for example, from left to right then from top to bottom. Depending on the platform, the sub-objects are selected and stored according to one of the following manners, without the list being restrictive:
in the case of a signal processing processor, with a small quick-access memory and a large slow memory, the size of the sub-objects is chosen to be able to process a sub-object without accessing the slow memory; it would be possible, for example, to take sub-objects corresponding to squares of 32×32 pixels: the result of the calculation on the previous sub-object is transferred to slow memory during the calculation relative to the current sub-object, and during the transfer from the slow memory to the quick-access memory of data required for the calculation relative to the following sub-object
in the case of a scalar processor with a small cache memory and a large slow memory, the size of sub-objects is chosen to be able to carry out the processing of a sub-object using the cache memory as much as possible; it would be possible, for example, to take sub-objects corresponding to squares of 32×32 pixels or sub-objects of 1 pixel or sub-objects of 4 pixels, notably in the case of an unprocessed image, of "raw" type,
in the case of a vector signal processor, the size of sub-objects is chosen as equal to or multiple of, the size of a vector that the platform is capable of processing and storing, sub-objects corresponding to 64 horizontal pixels could be taken, for example.

In the case where the object is of a different type to an image, the decomposition into sub-objects can be adapted in a similar way to the platform.

In languages such as C, this decomposition into sub-objects and the coding of corresponding loops must be explicit according to the platform, and performed manually for each platform. Vector signal compilers exist that endeavour to extract the sub-objects explicitly from coded loops, but their efficiency is limited, since they have to extract the algorithm concept before coding it automatically, which is very difficult.

The invention thus enables automation and increased efficiency of the adaptation to any platform.

The following table summarises the main differences between the invention and known languages:

|  | Invention | Known languages | Example of C |
|---|---|---|---|
| Sequence of operations | Coded manually | Coded manually | Coded manually |
| Relative displacement and Relative scale | Automatic and optimised coding (loops, memory access . . . ) | Necessitates manual coding of loops and memory access | Necessitates manual coding of loops and memory access |
| Loops | Automatic and optimised coding | Automatic and slow in some cases (Java) | Manual coding |
| Organisation of data in memory | Automatic and optimised coding | Automatic and slow in some cases (Java) | Manual coding |
| Management of edges | Automatic and optimised coding | Necessitates manual coding | Necessitates manual coding |
| Slow memory to fast memory exchange | Automatic and optimised coding | Necessitates an optimisation or manual coding | Necessitates an optimisation or manual coding |
| Allocation of registers | Automatic | automatic | automatic |
| Scheduling of instructions | Automatic | automatic | automatic |

In one embodiment, the first and second data and the parameter values are sufficient for the platform to be able to process the object.

Furthermore, the first data includes information on the number of bits on which the values representing the logical blocks are coded.

Specific formatted data is data obtained from the output of the processing means. This data is, in fact, a translation of generic formatted data, and as such they represent, in the same manner, a processing algorithm destined to be applied to an object to be processed. This specific formatted data contains notably specific operations, from generic operations, and describing the instructions that will be carried out on the object itself during the processing in the platform.

The generic formatted data according to the invention contains sufficient information to enable the calculation of this specific formatted data, without however being dependent on this platform. Indeed, the operations defined by the generic formatted data are generic operations applying to logical blocks, as defined further above. Thus, the first data excludes data describing generic operations involving one or more elementary information independently of other elementary information belonging to the same logical block(s). Indeed, given that a logical block is an abstract entity, it is not possible to distinguish and identify the different elementary information which compose it.

Thus, the generic formatted data can be supplied to different processing platforms, whatever the platform's architecture type and also whatever the format of the object to be processed. For example, the generic formatted data will be the same for an image of 3 million pixels as for an image of 5 million pixels. In this manner, when a new algorithm is developed, generic formatted data only needs to be defined once to be able to operate, after a very short time, this algorithm in an optimised manner in terms of performance and memory size on different platforms.

According to the type of generic operation used in the processing algorithm, the second data can present different characteristics.

According to one embodiment of the invention, at least one section of the second data provided to the processing means and/or the value of at least one parameter are, for a given generic operation, common to all the elementary information for the object to be processed.

According to another embodiment, at least one section of second data provided to the processing means and/or the value of at least one parameter depend on the absolute position of elementary information in the object to be processed.

For example, the use of a parameter that is common to all the elementary information for a filter enables an increase in the sharpness in a uniform manner.

For example, the use of a parameter dependent on the absolute position of elementary information in the object to be processed, for a filter, increases the sharpness in a more significant manner at the edge in order to compensate for an optic fault.

For example, the use of a parameter dependent on the absolute position of elementary information in the object to be processed for a vignetting correction generates a higher compensation at the edge in order to compensate for an optic fault.

For example, the use of a parameter dependent on the absolute position of elementary information in the object to be processed for a demosaicing operation permits the "red" pixels, "green" pixels and "blue" pixels in an unprocessed image received from a sensor to be processed differently.

For example, the use of second data, notably a displacement, dependent on the absolute position of elementary information in the object to be processed for a digital enlargement calculation ("zoom") or for a distortion correction calculation, generates the pixels required for calculating the interpolation at each point.

For example, the use of second data, notably a displacement, depending on the absolute position of elementary information in the object to be processed for a change of format, generates the pixels required for the new format. It is thus possible, for example, to obtain the values of pixels for a colour coding of YUV type for example, using separate brightness (Y) and red and blue (U and V) chrominance information.

In one embodiment of the invention, the generic operations include at least one generic position operation generating a logical block made up of the absolute position according to one of the object's dimensions, as well as a generic indirection operation, generating, from a first block, a second block by displacement and/or change of scale according to a third block or to a parameter.

In another embodiment, the generic operations include at least one elementary generic operation comprised in the group including: the addition of logical blocks and/or parameters, the subtraction of logical blocks and/or parameters, the calculation of the absolute value of the difference between logical blocks, the multiplication of logical blocks and/or parameters, the maximum out of at least two logical blocks and/or parameters, the minimum out of at least two logical blocks and/or parameters, the grouping and de-grouping of logical blocks, the calculation of a logical block by application of a parameter, corresponding to a correlation table, to a logical block, the conditional choice of a logical block out of at least two logical blocks and/or parameters, this choice being made as follows: if a>b, c is selected, otherwise d is selected, wherein a, b, c, and d are logical blocks and/or parameters, the bar chart for a logical block, the change of scale of a logical block according to a parameter and/or to a logical block, the relative displacement of a logical block according to a parameter and/or to a logical block, and an operation producing a block containing at least one coordinate.

The generic operations involving a logical block and a parameter, such as addition, can be translated in processing in the platform, and correspond, for example, when the generic operation concerns an addition, adding together each element or elementary information of the physical block processed, corresponding to the logical block, with the value for the parameter corresponding to the absolute position of the element or elementary information to be processed.

These operations by their very nature are relatively standard operations in image processing but also in the processing of other sorts of objects, however, when they are applied to logical blocks in combination with second data, these provide a solution to the problem posed. These operations act as a base for forming all the operations that can be implemented in a data processing algorithm.

Thus, in one embodiment, the generic operations include complex generic operations corresponding to groups of elementary generic operations used themselves. These groups notably include: the calculation of the median value of at least three logical blocks and/or parameters, which correspond to a group of generic operations made up of calculations of minimum and maximum, the multiplication/accumulation of logical blocks and/or of parameters, the convolution of a logical block with a parameter, which corresponds to a group of generic operations made up of multiplications and of additions with several relative positions, the addition combined with a maximum and a minimum, the calculation of a gradient, which corresponds to an absolute value of differences with two relative positions, the scalar product of a parameter made up of a vector and several logical blocks to produce a logical block, the calculation of a change of scale with interpolation which corresponds to a group of generic operations made up of scale changes and multiplications and additions with several relative positions, the combination of logical blocks, which corresponds to a group of generic operations made up of scale changes with several relative positions.

Some of the operations involve several logical blocks. It has been shown that, in this case, second data is provided relative to the positions of logical blocks implemented in relation to each other.

The relative positions and relative scales can correspond to diverse concepts depending on the type of object. They are applied between any 2 blocks, whatever their type (in the case of an image as described above, a logical block can notably be unprocessed, red, green, 8 bits . . . ).

In the case where the object is a still image with square pixels, the absolute or relative position and the absolute or relative scale can each correspond, in one embodiment, to 2 values (vertical and horizontal); the pixels of the top line of an object can have as absolute positions (0;0) (0;1) (0;2) and the pixels of the n th line can have as absolute positions (n;0) (n;1) (n;2); in this case the relative positions can be coded in the following manner: (−1; 0) indicates at the top, (0;1) indicates on the right and (2; −2) indicates 2 pixels below and 2 on the left; a relative scale of (0.5;0.5) then corresponds to a half resolution in each direction.

More generally, a combination of relative displacement and relative scale can be coded using 2 functions f and g in the following manner: (f(x;y);g(x;y))) for each pixel of absolute position x,y. It should be noted that a rounding off rule is necessary in order to take, for example, the nearest pixel. Thus:
- a relative position above is coded with f(x;y)=−1 and g(x;y)=0
- a relative scale of 0.7 is coded with f(x;y)=0.7*(x−x0) and g(x;y)=0.7*(y−y0); x0 and y0 corresponding to a parameter relative to an absolute position;
- a distortion correction is coded with f and g corresponding to the distortion field
- a YUV 4:2:2 format change i.e. YYUV using separate Y, U and V brightness and chrominance information can use, to obtain Y1 Y2 xx xx Y3 Y4 xx xx . . . using Y1 Y2 Y3 Y4 . . . , the next functions f(x;y)=(x−x0)*0.5 if x even, and (x+1−x0)*0.5 if x−x0 odd and with f(y)=y−y0; x0 and y0 corresponding to a parameter relative to an absolute position;

The following non-exhaustive list provides other examples of embodiments with various different type of objects:
- in the case where the object is a still image with hexagonal pixels positioned by line, two successive lines being offset by a half-pixel, the absolute or relative position and the absolute or relative scale can correspond each to 2 values (vertical and horizontal); the pixels of the top line of an object can have as absolute positions (0;0) (0;1) (0;2) . . . , and the pixels of the n th line can have as absolute positions (n;0.5) (n;1.5) (n;2.5) . . . if the line is an odd line, and (n;0) (n;1) (n;2) . . . if the line is an even line; the relative position can correspond to 2 values (vertical and horizontal), for example (−0.5; 0.5) indicates at the top right, (0,1) indicates on the right and (−0.5; 1.5) indicates the pixel located to the right of the top right pixel; a relative scale of (0.5;0.5) then corresponds to a half resolution in each direction. Also, a combination of relative displacement and relative scale can be coded using 2 functions f and g in the following manner: (f(x;y);g(x;y))) for each pixel of absolute position x,y. It should be noted that a rounding off rule is necessary in order to take, for example, the nearest pixel.
- in the case where the object is a moving image with square pixels, the absolute or relative position can correspond to 3 values (vertical, horizontal and temporal), for example, (−1; 0;0) indicates a pixel located at the top in the same image, (0; 0; −1) indicates the pixel with the same position in the previous image and (2; −2, −1) indicates the pixel located 2 pixels below and 2 to the left in the previous image. Also, a combination of relative displacement and relative scale can be coded using 3 functions f, g, h in the following manner: (f(x;y;t);g(x;y;t)); h(x;y;t)) for each pixel of absolute position x,y at time t. It should be noted that a rounding off rule is necessary in order to take, for example, the nearest pixel.
- in the case where the object is a single-channel sound, the absolute or relative position can correspond to 1 value (temporal); for example (−1) indicates the previous time, and (2) indicates 2 times after; a function f(t) then permits coding of a displacement and relative scales. A rounding off rule being used to take the nearest time.
- in the case where the object is a multi-channel sound, the absolute or relative position can correspond to 2 values (temporal, channel); for example (−1, 0) indicates the previous time for the same channel, and (2,1) indicates 2 times after for the following channel, organised for example spatially in a cyclic manner. Also, a combination of relative displacement and relative scale can be coded using 2 functions f, g in the following manner: (f(t;c);g(t;c)) for each audio sample positioned at the time t for the channel c. It should be noted that a rounding off rule is necessary in order to take, for example, the nearest time and channel.
- in the case where the object is a simulation mesh, the absolute or relative position can correspond to n values, each corresponding to a spatial or temporal dimension according to the meshing's topology. Also, a combination of relative displacement and relative scale can be coded using n functions. It should be noted that a rounding off rule is necessary in order to take, for example, the nearest node and time.
- in the case where the object is a modulated signal, the absolute or relative position can correspond to n values, corresponding respectively to time, where applicable to the frequency channel (transmission or reception on several frequencies) and where applicable (several transmitters or receivers positioned spatially) to a spatial dimension. Also, a combination of relative displacement and relative scale can be coded using n functions, and a rounding off rule must be chosen.
- in the case where the object is a set of measurements, the absolute or relative position can correspond to n values, each corresponding to one of the object's dimensions which, depending on the case, may be of temporal, spatial, frequency, phase or other type. Also, a combination of relative displacement and relative scale can be coded using n functions, and a rounding off rule must be chosen.
- in the general case where the object is of dimension n, the absolute or relative position can correspond to n values each corresponding to one of the object's dimensions which, depending on the case, can be of temporal, spatial, frequency, phase or other type. Also, a combination of relative displacement and relative scale can be coded using n functions, and a rounding off rule must be chosen.

Thus, in one embodiment of the invention, the relative positions and/or the relative scales of the logical blocks according to at least one of the object's dimensions, notably spatial and/or temporal, have integer values or fractional values as described in the above examples.

In one embodiment, the elementary information is represented by numerical values in fixed point. In this case, this fixed point must be taken into account when applying operations, so as not to lose any information in the results. For this purpose, in the same embodiment of the invention, the generic operations include offsetting operations, one saturation operation and/or at least one elementary generic operation combined with this saturation operation.

In one embodiment, the parameters include an information representing the type of coding for elementary information.

For example, in the case where the elementary information is an image's pixels, these are represented, for example, on 24 bits representing 3 colours in a red-green-blue coding (RVB), or even on N bits representing one colour per pixel varying according to the pixel's position for the unprocessed images received from a sensor, or even on 8 bits corresponding to the Y or U or V brightness and chrominance information for a coded image with a coding of YUV type. It is therefore useful to provide the processing means with data enabling it to know the type of coding in order to translate the generic formatted data correctly.

Preferably, the generic formatted data represents algorithms for processing objects making up images, and which are made up of elementary information forming pixels.

Thus, in one embodiment, the processing platform is part of an image capturing or rendering device, and the values of the parameters are linked to the characteristics of the optic and/or of the sensor and/or of the imager and/or of the electronics and/or of the software for the image capturing and/or rendering device.

The characteristics can be, notably, intrinsic fixed characteristics for all the objects or variables according to the object, for example noise characteristics which vary according to a sensor's gain.

The characteristics can also be identical for all the elementary or variable information according to the absolute position of the elementary information, for example the optic sharpness characteristics.

Nevertheless, the generic formatted data can represent other types of data processing algorithms. Thus, in one embodiment, the object to be processed is a digital audio signal, and, in this case, the elementary information consists in the audio samples for this signal. In this case, the relative positions present in the second data will generally be temporal positions. Nevertheless, these positions may happen to be spatial, notably in the case where the object to be processed is a sound present on several channels.

In another embodiment of the invention, notably in the case of digital simulation, the object to be processed is a numerical mesh and the elementary information is the spatial and/or temporal information characterising each point of the meshing.

BRIEF DESCRIPTION OF THE SEVERAL VIEWS OF THE DRAWING(S)

Figure 2:
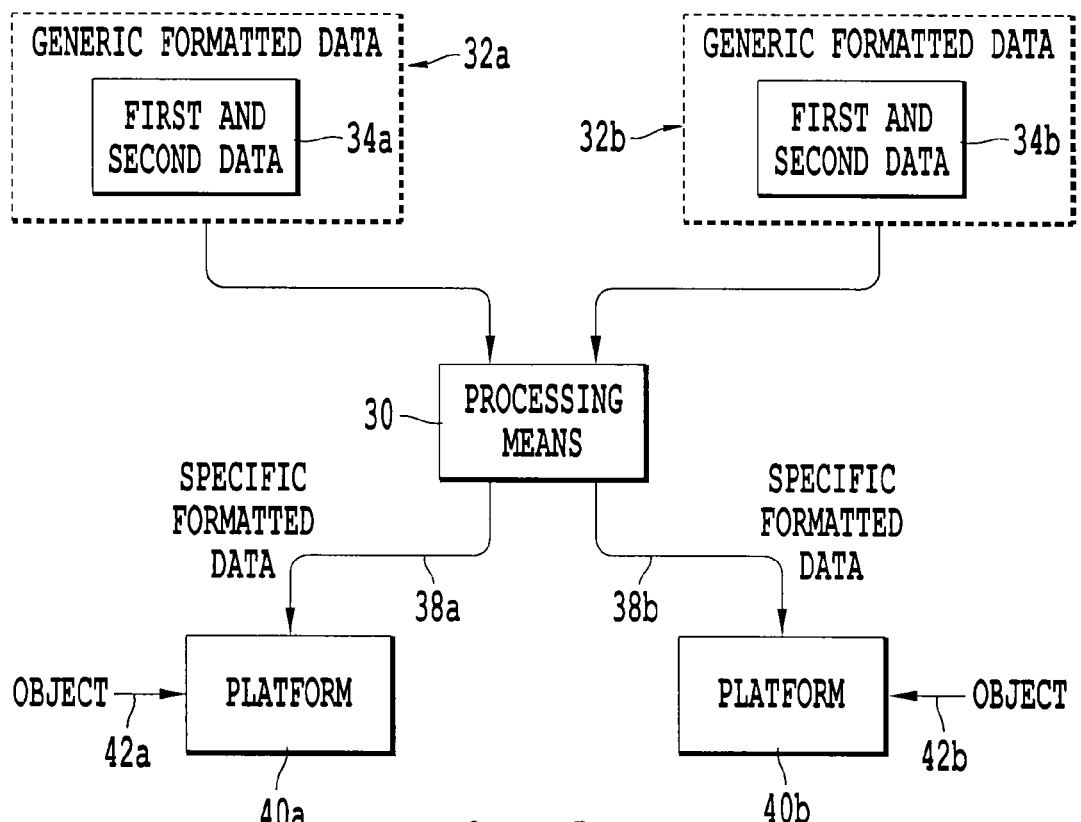
Figure 3:
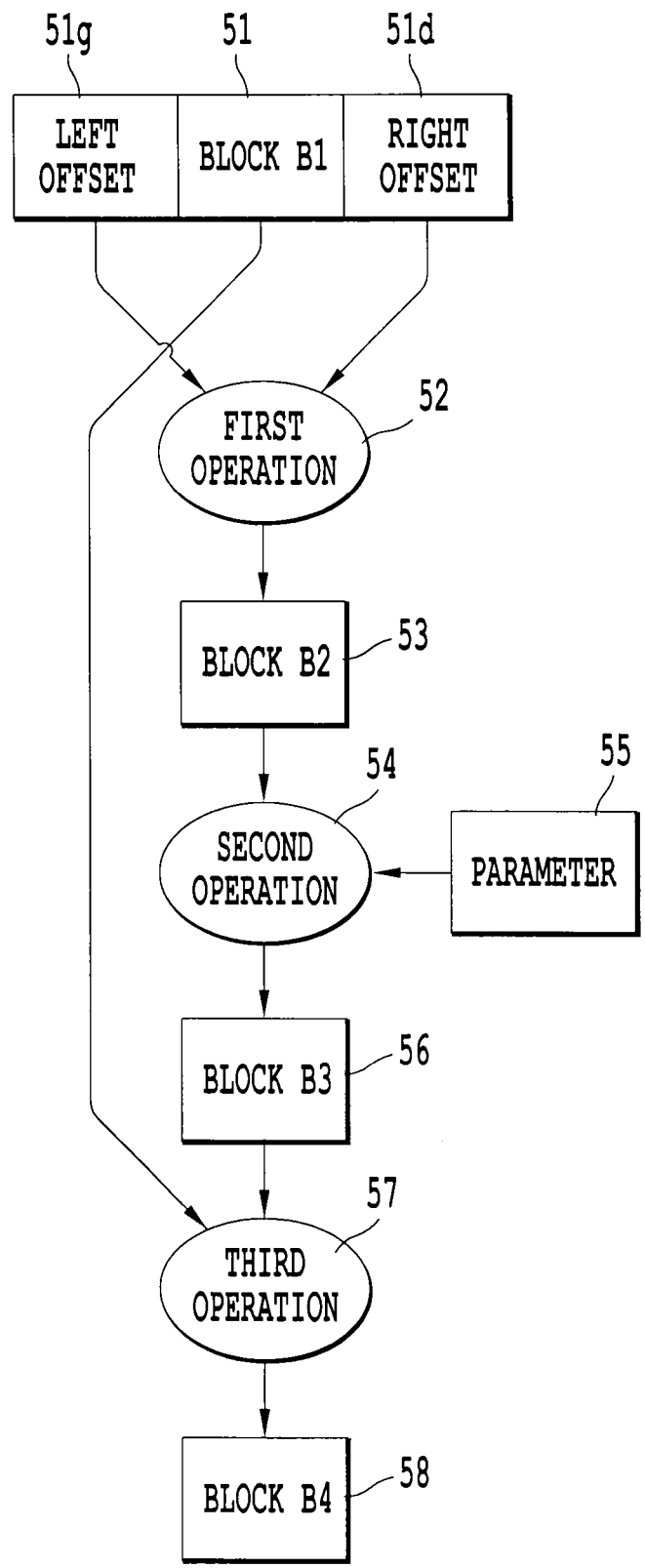

Other characteristics and advantages of the invention will become apparent from the non-restrictive description of some of its embodiments, this description being supported by figures wherein:

FIG. 1 shows a data processing device using a method conform with the invention, FIG. 2 shows a device analogous to that in FIG. 1, in the case where several processing platforms are used, and FIG. 3 shows an example of a sequence of generic operations applied to several logical blocks and to one parameter.

DETAILED DESCRIPTION OF THE INVENTION

The device shown in FIG. 1 is destined to process an image 22. This image comprises a set of pixels, each of which is represented by at least one numerical value.

In this device, a digital data processing means 10 is provided with generic formatted data 12. This processing means is a compiler in the example.

The generic formatted data, supplied by a method conform to the invention, includes first and second data 14 which describe sequences of generic operations and which describe the relative positions of the logical blocks involved in these generic operations. This first and second data will be illustrated by table 1.

Using this generic formatted data 12, the processing means 10 provides the processing platform 20, such as an image capturing or image rendering device, directly or indirectly, for example, via a compiler, with specific formatted data 18.

The specific formatted data contains different types of data, such as data concerning the organisation of pixels in the platform's memory, the order in which the pixels are processed by the platform or even the specific operations performed by the platform, and their grouping.

The processing platform 20 then uses said specific formatted data 18 to process the image 22 that it receives on inbound.

The system shown in FIG. 2 is analogous to that shown in FIG. 1, in the case where two processing platforms are used.

In this case, a processing means 30 is provided with two series of generic formatted data 32a and 32b. This generic formatted data 32a and 32b each contains first and second data, respectively 34a for generic formatted data 32a, and 34b for generic formatted data 32b. This first and second data presents the same characteristics as the first and second data described in relation with FIG. 1.

This processing means 30 provides two platforms 40a and 40b with specific formatted data 38a and 38b corresponding respectively to generic formatted data 32a and 32b. Platform 40a thus processes an object 42a according to data 32a or according to data 32b. Also, platform 40b processes an object 42b according to data 32a or according to data 32b. Thus, the same processing means 30 is used to provide specific formatted data to two different processing platforms, 40a and 40b.

FIG. 2 thus illustrates several advantages of the invention:
in the case where platforms 40a and 40b are identical, generic formatted data 32a can be replaced rapidly by 32b and translated into specific formatted data 38b optimised for the platform. This would reduce the time taken for the market release of the platform.
in the case where platforms 40a and 40b are different, and formatted data 32a and 32b are identical, they can be translated rapidly into specific formatted data 38a and 38b optimised for each platform. This would also reduce the time taken for the market release of several platforms.

Table 1 below and FIG. 3 show an example of a generic operations sequence applied to a logical block B1. This sequence includes three generic operations. The table's columns show, in order:
The operation's rank in the sequence,
the name of the generic operation, the logical block (output) on which the result of the generic operation is inscribed, i.e. the location where this result would be, were the object reconstituted at the end of each operation, the first input (input 1) of the generic operation, which can be a logical block or a parameter, the relative position of the logical block to be used with relation to the logical block at input 1, if applicable, the second input (input 2) of the generic operation, which can also be a logical block or a parameter, and the relative position of the logical block to be used with relation to the logical block at input 2, if applicable, The information located in the "relative position" columns is the information present in the second data provided to a processing means using a method according to the invention. In this table, this information is found in the form of "left" and "right" for the purpose of simplicity, however in reality, in generic formatted data, it can also be coded by numerical values such as (0;1) as described in the embodiment examples above and/or by functions such as f(x;y).

In one embodiment, the generic operations include at least one generic position operation generating a logical block made up of the absolute position according to one of the object's dimensions, as well as a generic indirection operation, generating, from a first block, a second block by displacement and/or change of scale according to a third block or to a parameter. The calculations of functions giving the relative position and/or the relative scale can then be calculated, for example, 0.5*(x−100) using generic operations on the blocks, then using the generic indirection operation to perform the relative displacement and/or the corresponding relative change of scale.

Table 1 is only an example of coding, the first data and second data can be coded in diverse ways in tabulated format, but also in symbol format, in graph format or in any other format. Furthermore, additional information relative to data types, to offsets and to saturations are not shown in the example for the purpose of simplification.

TABLE 1

| Sequence | Operation | Output | Input 1 | Relative position input 1 block | Input 2 | Relative position input 2 block |
|---|---|---|---|---|---|---|
| 1 | Addition | B2 | B1 | left | B1 | Right |
| 2 | Table | B3 | Param 1 | | B2 | |
| 3 | Multiplication | B4 | B3 | | B1 | |

The first logical block used in this sequence of operations is a logical block B1 (51). The first generic operation is an addition (52) between the logical block B1 offset to the left (51g), and logical block B1 offset to the right (51d). The result of this addition is recorded in block B2 (53): B2=B1left+B1right.

The second operation (54) is a transformation of block B2 (53) with relation to a table. This operation therefore has block B2 (53) in input and a parameter Param1 (55) which represents the modification table. The result of this operation is recorded in block B3 (56): B3=LUT (Param1, B2).

The third and final operation (57) in this sequence is a multiplication of logical blocks. This operation has logical block B3 (56) and logical block B1 (51): B4=B3*B1 for inputs.

Logical block B4 (58) is thus the block obtained at the end of the sequence of generic operations.

The generic formatted data in the example in table 1 is independent from the platform, from the object's decomposition into sub-objects, from the scrolling mode of the object's elementary information, from the order in which the elementary information will be processed in the platform, as well as from the stored organisation. Indeed, the generic formatted data in table 1 can be translated in diverse manners into specific formatted data or into code for the platform, for example, without the list being restrictive, according to the following translations.

A first example of translation, although not optimal in terms of memory and calculation time, illustrates a simple translation without involving decomposition into sub-objects:

For each of the input object's pixels BP1 (corresponding to logical block B1) excluding the two left-hand and right-hand columns, the pixels being scrolled through from left to right then from top to bottom:

Add together the pixel on the left of the current pixel and the pixel on the right, store the result in a physical block BP2 (corresponding to logical block B2).

For each pixel of BP2 scrolled through from left to right then from top to bottom:

apply the table to the current pixel, and store the result in a physical block BP3 (corresponding to logical block B3)

For each pixel of BP3 scrolled through from left to right then from top to bottom:

Multiply the current pixel by the corresponding pixel of BP1, and store the result in the physical output block BP4 (corresponding to logical block B4).

A second example of translation shows that the size and memory used can be reduced without changing generic formatted data. Indeed, in the first example, 4 physical blocks of a size akin to the image are used. Only 2 physical blocks can be used using the same memory for BP2, BP3 and BP4. The following translation is obtained:

For each of the input object's pixels BP1 (corresponding to logical block B1) excluding the two left-hand and right-hand columns, the pixels being scrolled through from left to right then from top to bottom:

Add together the pixel on the left of the current pixel and the pixel on the right, store the result in a physical block BP2 (corresponding to logical block B2).

For each pixel of BP2 scrolled through from left to right then from top to bottom:

apply the table to the current pixel, and store the result in a physical block BP2 (now corresponding to logical block B3)

For each pixel of BP2 scrolled through from left to right then from top to bottom:

Multiply the current pixel by the corresponding BP1 pixel and store the result in the physical output block BP2 (now corresponding to logical block B4).

A third example of translation shows that the calculation time can be reduced without changing generic formatted data. Indeed, in the second example, 2 physical blocks of size akin to the image are used, but the physical block BP2 is written 3 times in full, the physical block BP1 is read 2 times in full and the physical block BP2 is read 2 times in full. This can be limited to only one reading and one writing, with a different scrolling mode and different blocks. This reduces the number of instructions required, but also reduces memory access requirements. The following translation is obtained:

For each of the input object's pixels BP1 (corresponding to logical block B1) excluding the two left-hand and right-hand columns, the pixels being scrolled through from left to right then from top to bottom:

Add together the pixel on the left of the current pixel and the pixel on the right, apply the table to the result and multiply the table output by the current pixel, store the result in the current physical output block BP2 (corresponding to logical block B4)

In a fourth example, more specifically adapted to a scalar processor with cache, the result is written in the same memory zone as the input. This reduces the memory size even further and renders memory access local, which is very beneficial in the case of a cache memory or a paged memory. Thus, the following translation is obtained:

For each of the input object's pixels BP1 (corresponding to logical block B1) excluding the two left-hand and right-hand columns, the pixels being scrolled through from left to right then from top to bottom:

Add together the pixel on the left of the current pixel and the pixel on the right, apply the table to the result and multiply the table output by the current pixel, store the result in the current physical output block BP1 in place of the pixel on the left of the current pixel (the left pixel is no longer used contrary to the current pixel which will become the left pixel for the next iteration; BP1 corresponds partially to logical block B4 and partially to logical block B1)

A fifth example of translation is specifically adapted to a signal processing processor with a small quick-access memory and a large slow memory, each sub-object is a rectangle for example 32×32 or any other value maximising the use of the quick-access memory, the rectangles being adjoined. Thus, the following translation is obtained:

For each sub-object, the sub-objects being scrolled from left to right then from top to bottom:

Launch a transfer via a DMA ("direct memory access") mechanism of the next physical input block from the slow memory to the quick-access memory, corresponding to the next sub-object extended by one column to the left and one to the right, making 32×34

Launch a transfer via a DMA ("direct memory access") mechanism of the previous physical output block from the quick-access memory to the slow memory.

The physical block is taken, corresponding to the current sub-object extended by an additional column to the left and to the right, making 32×34, and obtained at the end of the DMA of the previous iteration For each pixel of the physical input block (corresponding to logical block B1) excluding the two columns on the left and right scrolled through from left to right then from top to bottom:

Add together the pixel on the left of the current pixel and the pixel on the right, apply the table to the result and multiply the table output by the block's current pixel, store the result in the current physical output block (corresponding to logical block B4)

A sixth example of translation is specifically adapted to a vector signal processor capable of applying one same calculation to the different pixels of the vector, each sub-object is a rectangle, for example 64 horizontal pixels or any other value equal to the size of a vector that the platform is capable of processing and storing. This translation does not require any memory since vectors are processed one at a time. Thus, the following translation is obtained:

For each sub-object V1 of the input object BP1 (corresponding to logical block B1) excluding the two columns on the left, the sub-objects being scrolled through from left to right then from top to bottom:

At the start of each line create a vector V0 containing on the right the line's 2 left-hand pixels Extract form V0 and V1, vector V2 corresponding to the two right-hand pixels of V0 and to the left-hand pixels of V1 excluding the 2 right-hand pixels of V0; add together V1 and V2 to obtain V2, apply the table to each pixel of V2 to obtain V2, Extract from V0 and V1, the vector V3 corresponding to the right-hand pixel of V0 and to the left-hand pixels of V1 excluding the right-hand pixel of V0; copy V1 in V0 for the following iteration; multiply V2 by V3 to obtain V2, store the result V2 in the current physical output block.

The above examples of translations show that it is possible, using the same generic formatted data, to translate in a number of ways with memory structures, loops and a degree of parallelism adapted to very diverse platforms. Particularly:

the size of the code can be reduced using only one single loop, and/or the size of the memory can be reduced, to 0 in the example, but in the more general case where there are vertical filters, some memory lines are required to prevent having to repeat calculations for the input data of vertical filters, and/or the number of instructions required can be reduced, notably by grouping the loops, and/or adapt to any size of vector, and/or adapt to any memory architecture.

For the purpose of simplification, the examples produce a smaller image than the input image. If necessary, an output image of identical size to the input image can be obtained, by adding code at the beginning and end of each line to duplicate the edge pixel.

The invention claimed is:

1. A method for providing generic formatted data describing a processing operation to be carried out on an object at one or plural dimensions, comprised in the group consisting of an image, a digital audio signal, a sequence of images, a modulated signal, simulation data, and a numerical mesh; the generic formatted data being provided to at least one digital data processor, configured to translate the generic formatted data into specific formatted data, the generic formatted data comprising data relative to logical blocks, at least one of the logical blocks corresponding to an object to be processed according, directly or indirectly, to specific data formatted by at least one processing platform with processor(s) and memory(s), located upstream from the processor or integrated into the processor, the object being made up of elementary information of a same type, all information being represented by at least one numerical value, the elementary information being comprised in the group consisting of pixels of an image, samples of a digital audio signal, intensity and phase of a modulated signal, data characterizing a status of simulation data, temporal and/or spatial information characterizing points of a numerical mesh, the method comprising:

providing the processor with first data, being part of generic formatted data, describing at least one sequence of generic operations to be performed on at least one logical block and/or on at least one parameter, and providing the processor, for generic operations involving plural logical blocks, with second data, being part of generic formatted data and referring to the relative position, according to at least one of the object's dimensions, spatial and/or temporal, of logical blocks and/or parameters in relation to each other and/or referring to the relative scale, of logical blocks and/or parameters in relation to each other, wherein the generic formatted data provided to the processor excludes the data relative to the identification of elementary information and to the order in which the elementary information will be processed by the platform, such that the generic formatted data is independent from the processing platform used, and the generic formatted data provided is independent from data relative to the decomposition of the object into sub-objects, to form, size and overlay of the sub-objects, and to storage of elementary information in a memory, data relating to the order and data relating to the decomposition of the object into sub-objects determined by the processor.

2. A method according to claim 1, wherein at least one section of the second data provided to the processor and/or the value of at least one parameter are, for a given generic operation, common to all the elementary information of the object to be processed.

3. A method according to claim 1, wherein the second data provided to the processor and/or the value of the parameter(s) depend, for a given generic operation, on absolute position of elementary information in the object to be processed.

4. A method according to claim 1, wherein the generic operations include at least one generic position operation generating a logical block made up of absolute position according to one of the object's dimensions, as well as a generic indirection operation, generating, from a first block, a second block by displacement and/or change of scale according to a third block or to a parameter.

5. A method according to claim 1, wherein the generic operations include at least one at least one elementary generic operation comprised in the group consisting of addition of logical blocks and/or of parameters; subtraction of logical blocks and/or of parameters; calculation of absolute value of the difference between the logical blocks; multiplication of logical blocks and/or of parameters; maximum out of at least two logical blocks and/or parameters; minimum out of at least two logical blocks and/or parameters; grouping and de-grouping of logical blocks; calculation of a logical block by application of a parameter corresponding to a correlation table, to a logical block; conditional choice of a logical block out of at least two logical blocks and/or parameters, the choice being made in the following manner: if a>b, c is selected, otherwise d is selected, wherein a, b, c, and d are logical blocks and/or parameters; a bar chart for a logical block; change of scale for a logical block according to a parameter and/or to a logical block; relative displacement of a logical block according to a parameter and/or to a logical block; and an operation producing a block containing at least one coordinate.

6. A method according to claim 5, wherein the generic operations include complex generic operations corresponding to groups of elementary generic operations used themselves, the groups consisting of calculation of median value of at least three logical blocks and/or parameters that correspond to a group of generic operations made up of minimum and maximum, multiplication-accumulation of logical blocks and/or of parameters, convolution of a logical block with a parameter that corresponds to a group of generic operations made up of multiplications and additions with plural relative positions, addition combined with a maximum and a minimum, subtraction combined with a maximum and a minimum, calculation of a gradient that corresponds to an absolute difference value with two relative positions, scalar product of a parameter made up of a vector and plural logical blocks to produce a logical block, calculation of a change of scale with interpolation that corresponds to a group of generic operations made up of change of scale and of multiplications and of additions with plural relative positions, combination of logical blocks that correspond to a group of generic operations made up of change of scale with plural relative positions.

7. A method according to claim 1, wherein the relative positions and/or relative scales, according to at least one of the object's dimensions, spatial and/or temporal, of logical blocks have integer values or fractional values.

8. A method according to claim 1, wherein the elementary information is represented by numerical values in fixed point, and in which the generic operations include offset operations, a saturation operation and/or at least one elementary generic operation combined with this saturation operation.

9. A method according to claim 1, wherein the object to be processed is an image and the elementary information is pixels of the image.

10. A method according to claim 9, wherein the processing platform is part of an image capturing and/or rendering device, and wherein the values of the parameters are linked to the characteristics of the optic and/or sensor and/or imager and/or electronics and/or software for the image capturing and/or image rendering device.

11. A method according to claim 1, wherein the object to be processed is a digital audio signal and the elementary information is audio samples of the digital/ audio signal.

12. A method according to claim 1, wherein the object to be processed is a numerical mesh and the elementary information is spatial and/or temporal information characterizing each point of the meshing.

\* \* \* \* \*